United States Patent [19]

Brearley et al.

[11] Patent Number: 5,088,042

[45] Date of Patent: Feb. 11, 1992

[54] ELECTRONIC BRAKING SYSTEM

[75] Inventors: Malcolm Brearley, West Midlands; Richard B. Moseley, Warwickshire, both of England

[73] Assignee: Lucas Industries public limited company, Birmingham, England

[21] Appl. No.: 488,976

[22] Filed: Mar. 5, 1990

[30] Foreign Application Priority Data

Mar. 4, 1989 [GB] United Kingdom ............... 8905022

[51] Int. Cl.$^5$ ............................................ B60T 13/00
[52] U.S. Cl. .............................. 364/426.01; 303/9.62; 188/349
[58] Field of Search ................. 364/426.01, 424.05; 303/111, 9.72, 9.62, 9.71; 188/349

[56] References Cited

U.S. PATENT DOCUMENTS

| | | | |
|---|---|---|---|
| 4,068,900 | 1/1978 | Doerfler et al. | 303/9.72 |
| 4,768,840 | 9/1988 | Sullivan et al. | 303/6.01 |
| 4,850,650 | 7/1989 | Eckert et al. | 303/9.62 |
| 4,943,123 | 7/1990 | Takeda et al. | 303/111 |

*Primary Examiner*—Thomas G. Black
*Attorney, Agent, or Firm*—Oblon, Spivak, McClelland, Maier & Neustadt

[57] ABSTRACT

An electrically controlled braking system, in which the operation of the brake actuation is split into three bands depending upon the brake demand level, such that at low demand in a first band the braking pressures are set to generate equal wear at the vehicle axles, and at higher demands in a third band braking pressures are set to apportion braking between axles dependent upon the axle loads being carried, while in a second band, located intermediate the first and second bands, the braking is gradually changed from being equal to being fully apportioned, the extent of this change-over depending upon the actual level of demand within this second band.

5 Claims, 6 Drawing Sheets ated lining wear reflects this imbalance and causes service problems which would be alleviated if all linings could be caused to wear equally. This would be more convenient in allowing a single service operation to replace all worn linings.

ELECTRONIC BRAKING SYSTEM

DESCRIPTION

The present invention relates to electronic braking systems (EBS) and is concerned in particular with a means of obtaining wear equalisation between individual wheel axles within the system.

In vehicles equipped with an Electronic Braking Systems as described for example in our European Patent Applications Nos. 86 303 997.0 and 86 303 998.8, the braking levels are distributed between the various axles of a vehicle on the basis of measured axle load, stored during non braking. This apportioning is ideal for utilisation of surface adhesion but on vehicles which carry an often repeated state of load which is unbalanced between axles, this may produce unbalanced brake usage between the vehicle axles. This is satisfactory insofar as effective braking is concerned but the resulting lining wear reflects this imbalance and causes service problems which would be alleviated if all linings could be caused to wear equally. This would be more convenient in allowing a single service operation to replace all worn linings.

It is thus object of the present invention to provide an electronic braking system wherein, at least under specified conditions, the braking level between axles is selected so as to achieve wear equalisations between the brake linings of the various brakes.

In accordance with the present invention there is provided an electronically controlled braking system in which the operation of the brake actuation is split into three bands depending upon the brake demand level, such that at low demand in a first band the braking pressures are set to generate equal wear at the vehicle axles, and at higher demands in a third band braking pressures are set to apportion braking between axles dependent upon the axle loads being carried, whilst in a second band, located intermediate the first and second bands, the braking is gradually changed from being equal to being fully apportioned, the extent of this change-over depending upon the actual level of demand within this second band.

Preferably, the transition occurring within the second band has the braking pressures calculated to give gradual separation of axle pressures into the fully apportioned mode, whilst maintaining total braking pressure demands at a level such as to give the required vehicle deceleration.

In order to maximise braking effect under adverse road conditions it is preferred that any wheel skidding occurring causes immediate reversion to a fully apportioned braking distribution, such distribution being retained until the brakes are released.

In some embodiments, the actual wear equalisation is monitored by sensors incorporated within the brakes and wear error signals are produced for each brake compared with the average wear, such error signals being used to generate limited values of pressure differential between brakes such as to create small increases in braking at those brakes with the minimum wear and small reductions in braking at those brakes with above average wear.

The invention is described further hereinafter, by way of example only, with reference to the accompanying drawings, in which.

Research into the extent of wear of brake linings under normal road conditions has indicated that the distribution of braking deceleration is such as to cause most wear to take place at vehicle deceleration rates of under 2 m/sec$^2$ because these lower level stops are much more frequent than any other level. However, the load apportioning ability of an EBS becomes more important as the vehicle deceleration increases and more of the available road adhesion is utilized. Thus, in accordance with the present invention, it is considered that a reasonable compromise is attainable by making braking proportional to axle load at high levels of vehicle deceleration but at relatively low vehicle deceleration demands distributing the braking equally between the vehicle axles by setting braking pressure to the axles at levels which will produce the same proportion of full braking output, such that lining wear is equalised between axles.

Figure 1:
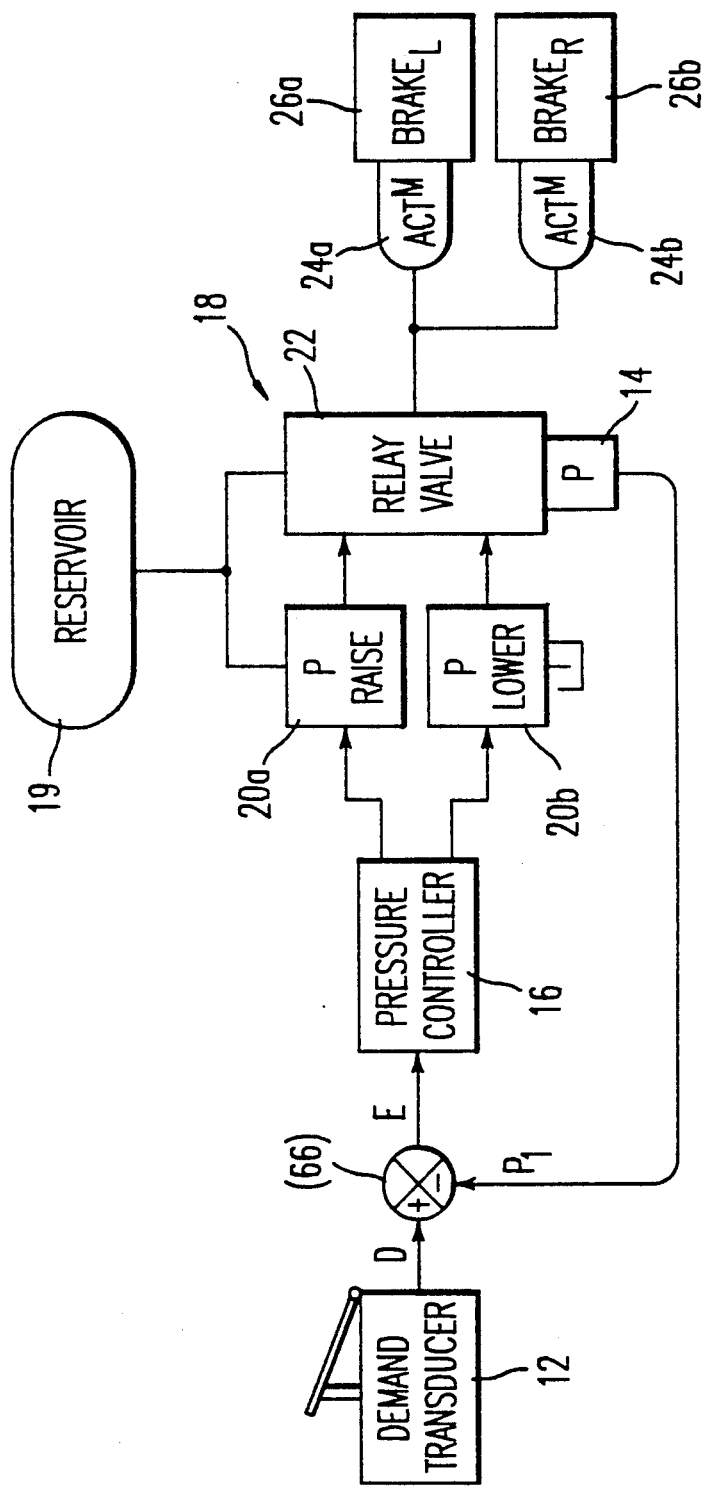
FIG. 1 shows one example of a basic pressure control loop used in an electronic braking system.

The EBS sets and controls braking pressures in response to driver demands by the use of pressure control loops, one example of which is shown in FIG. 1. This Figure shows a typical pressure control loop 10 taking an electrical input signal D from a brake pedal transducer 12 which is used to provide a pressure error signal E by comparison with the output signal $P_1$ of a pressure transducer 14, this pressure error E forming the input to a computer based pressure controller 16 which generates an output signal causing the pressure developed by an electro-pneumatic or electro-hydraulic converter 18 to change in a direction such as to reduce the amplitude of the pressure error E. The converter 18 is supplied by a pneumatic or hydraulic reservoir 19, as appropriate.

The nature and circuit of the pressure controller 16 depends upon the type of converter 18 employed. Two main converter principles are well known, namely the analogue system in which a valve is employed with pressure output developed proportional to solenoid current and a digital system, as shown in FIG. 1, in which a pair of simpler solenoid valves 20a, 20b is employed to raise or lower a control chamber pressure by selective energisation of these valves 20a, 20b. One form of pneumatic converter employs a relay valve 22 which responds to this control chamber pressure and which re-balances into the closed condition when the brake pressures at the brake actuators 24a, 24b for left and right hand brakes 26a, 26b become equal to said control pressure. Such a valve has an advantage in that the control chamber pressure responds rapidly to valve opening, giving a fast control loop which is accurate and responsive.

Thus, it should be noted that, whereas FIG. 1 shows an air braked system, the present invention can equally be applied to hydraulic systems, employing correspondingly different forms of pressure modulator well known in the art.

The pressure demands for each of the several pressure control loops associated with respective axles (e.g. front and rear axles) are set by the computerbased controller 16 and so can be changed under software control. Details of the control computer itself are well known to those skilled in the art and so are not repeated herein in order to avoid unnecessary verbiage. Thus, in the present system, tests are made in the course of the controller program on the drivers braking demand level and one of three decisions is made as follows based on the detected level;

i) Below 0.2 g demand, axle pressures are set for equal wear;

ii) Above 0.3 g demand, axle pressures are set based on axle load measurements to give full load apportioning; and iii) Between 0.2 g and 0.3 g the change-over from equal wear to load apportioning is progressive and depends upon the actual demand level, e.g. at 0.25 g the change is 50%.

Figure 2:
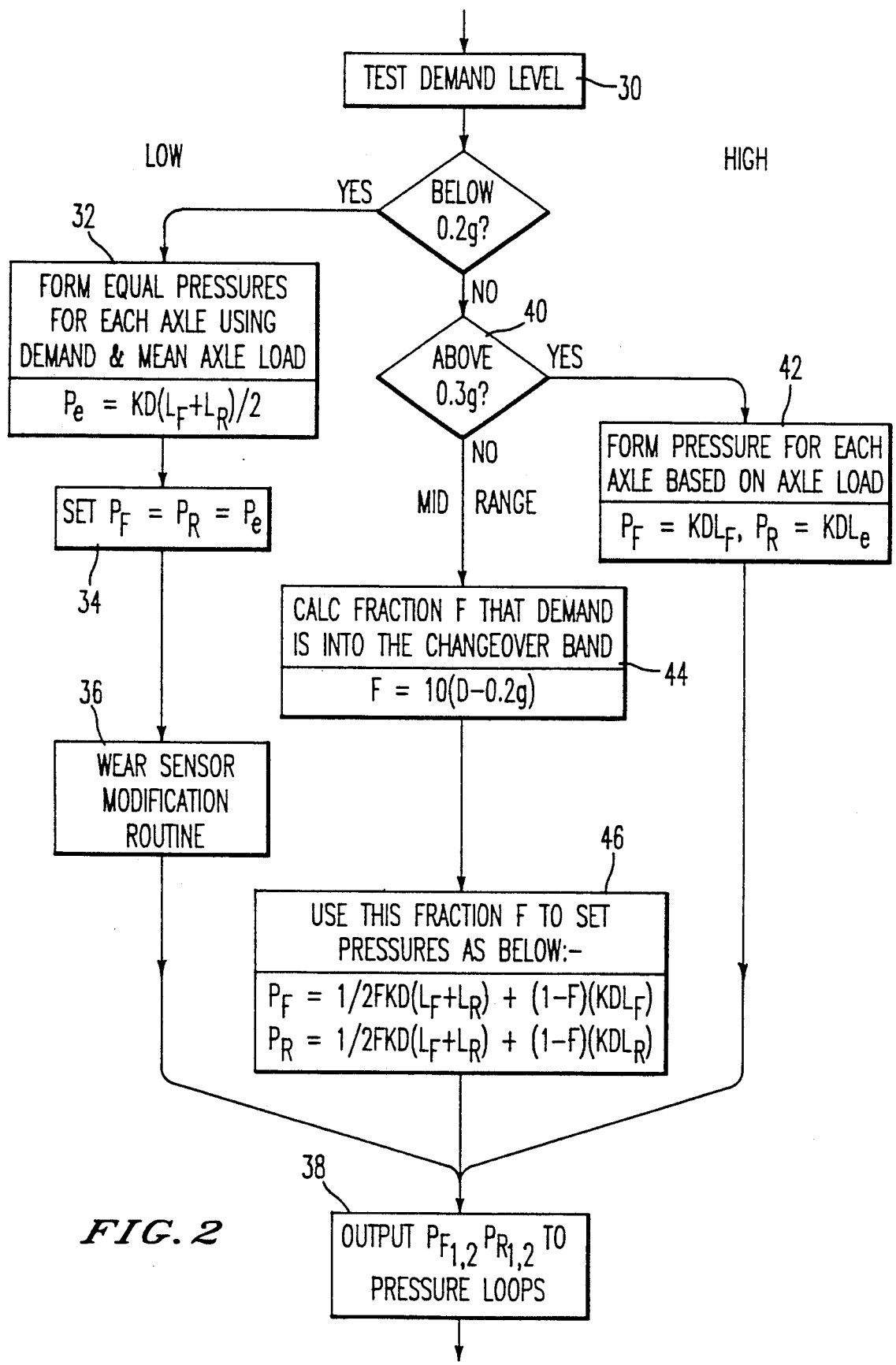
FIG. 2 is a flow diagram illustrating the manner in which braking pressure is established in a system in accordance with the present invention under different braking levels.

This operation can be achieved in accordance with the basic flow diagram shown in FIG. 2. The prevailing drivers braking demand level D is tested at 30. If the demand deceleration is below 0.2g, then equal pressures for each axle are arranged to be formed at 32 using demand and mean axle load to establish:

$$P_e = kD \frac{(L_F + L_R)}{2}$$

Where $P_e$ is the braking pressure established,

D is the drivers demand signal, $L_F$ and $L_R$ are the measured loads on the front and rear axles, and k is a constant.

This braking pressure $P_e$ is then set at 34 for both front and rear braking pressures and, subject to a wear sensor modification sub-routine 36 described further hereinafter, are output at 38 to the pressure control loops.

If, on the other hand, the drivers demand level is above 0.2 g but is found at 40 to be above 0.3 g, then a pressure signal for each axle is formed at 42 based on axle load. In this case, the front and rear axle pressures $P_F$ and $P_R$ are established using :

$P_F = KDL_F$ and $P_R = KDL_R$ where K i a further constant.

However if it is determined at 40 that the drivers demand level is above 0.2 g but below 0.3 g then the fraction F that demand is into the change-over band, i.e. above 0.2 g, is calculated at 44 using:

$F = 10 (D - 0.2 g)$

This fraction F is then used at 46 to set the front and rear pressures $P_F$ and $P_R$ in accordance with:

$P_F = \frac{1}{2} FKD (L_F + L_R) + (1 - F) [KDL_F]$.

and $P_R = \frac{1}{2} FKD (L_F + L_R) + (1 - F) [KDL_R]$

The aforegoing operations are achieved by software control using well known techniques which need not be described in detail herein.

The basic operation described above should, however, be modified under certain circumstances to accomodate abnormal operating conditions.

Thus, under certain road conditions involving slippery surfaces, lower braking demands can cause skidding and in such circumstances, braking distribution is required to favour adhesion utilisation rather than equal wear. Thus, irrespective of demand level or achieved vehicle deceleration, the first detected instance of genuine skidding at any wheel preferably causes pressure deployment at the brakes of each axle to be re-adjusted so that the target levels are consistent with correct load sensitive braking distribution. This situation is maintained for the remainder of the stop.

Figure 3:
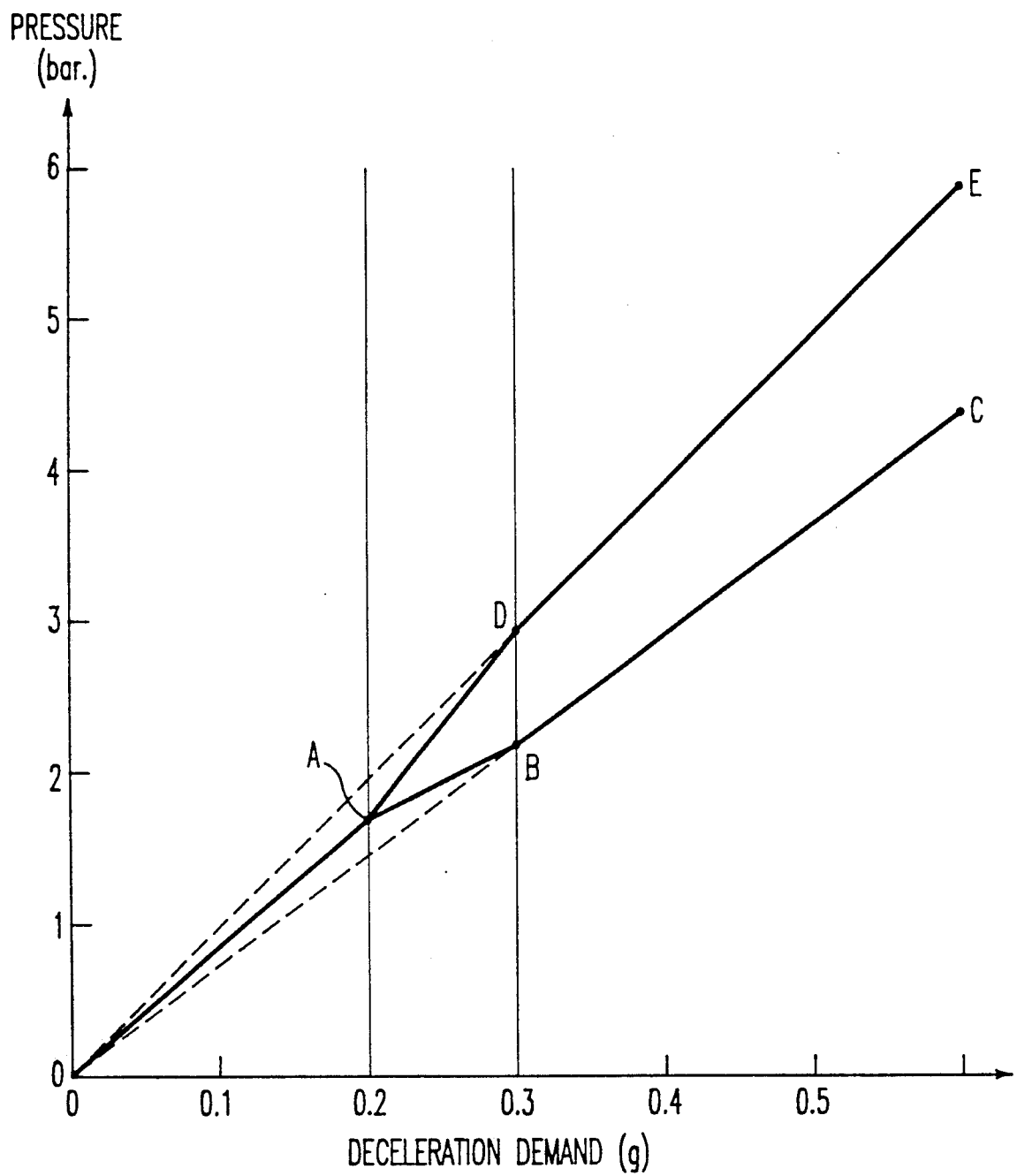
FIG. 3 shows a series of curves illustrating operation of a system in accordance with the present invention under different levels of deceleration demand.

Furthermore, when the braking demand D is gradually increased from below 0.1 g to above 0.3 g, as described above, the braking is arranged to be made equal at each axle initially and is then progressively adjusted above 0.2 g, to gradually move to apportioned braking at the 0.3 g level. This is illustrated in the diagram of FIG. 3 which shows pressure (P) plotted against deceleration demand (g). Thus, front and rear pressures $P_F$, $P_R$ are selected for equal braking between 0 and 0.2 g demand. FIG. 3 assumes equally sized brakes on both axles for the purposes of simplification in that pressures can be equal between points 0 and A. Above 0.2 g, increasing demand causes the rear pressure to reduce the rate of increase and follow line AB whereas the front brakes increase the pressure build-up following line AD. Thus at 0.3 g demand, the brake pressures $P_F$, $P_R$ are apportioned on a measured average load basis as points B and D are reached for rear and front axles respectively. Further increase of braking demand causes the rear axle pressure to build up along line BC and the front axle to build up along line DE.

A further aspect which can be taken into account is that all brakes have some level of hysteresis and in some air actuated brakes this may be substantial. To take account of the hystersis a software option can be included which is arranged to generate, for a falling demand, operation which, once having gained the fully apportioned status during any stop, retains this control feature as the demand drops below 0.3 g so that the front and rear axles continue to operate in pressure distribution lines EDO and CBO respectively, as shown by the dotted lines in FIG. 3.

However, vehicles with low hysteresis are not likely to be set to use this option and are therefore designed to return by distribution points CBAO for the rear and EDAO for the front, as demand falls. Clearly, as is the case in many stops, demand is suddenly returned to zero and then the route is purely academic as pressures are caused to fall to zero at the maximum rates which can be achieved by the pressure control means so that these provisions explained above are of importance only in stops with gradual increase and decrease of braking.

The aforegoing provisions are organised to obtain wear equalisation on an open loop basis in that no account is taken of actual wear by the system in establishing the braking pressure levels. However, further measures can be made available for use in conjunction with those described or applicable independently. These measures are dependent upon the employment of a respective wear sensor (not illustrated, but known per se) which is incorporated into each brake on the vehicle. One version of this sensor consists of a measurement capsule having a predetermined electrical resistance which is increased as the capsule, which is embedded in the lining, wears away. The wear sensor generates a signal which indicates how much of the lining has been worn away and comparison of these signals shows the distribution of wear. The system as described above can use these wear signals in the low demand/equal wear mode by adjustment of pressures applied to the brakes to compensate for the actual measured wear. Thus, the brake with the lowest wear is arranged to receive slightly higher pressure than the average figure and that brake with the highest wear is arranged to receive slightly under the average pressure. Because wear signals are generated for each brake and pressures are set and controlled for each wheel individually, the braking demands are made individual to each wheel once the pressure demand for the vehicle has been established.

Figure 4:
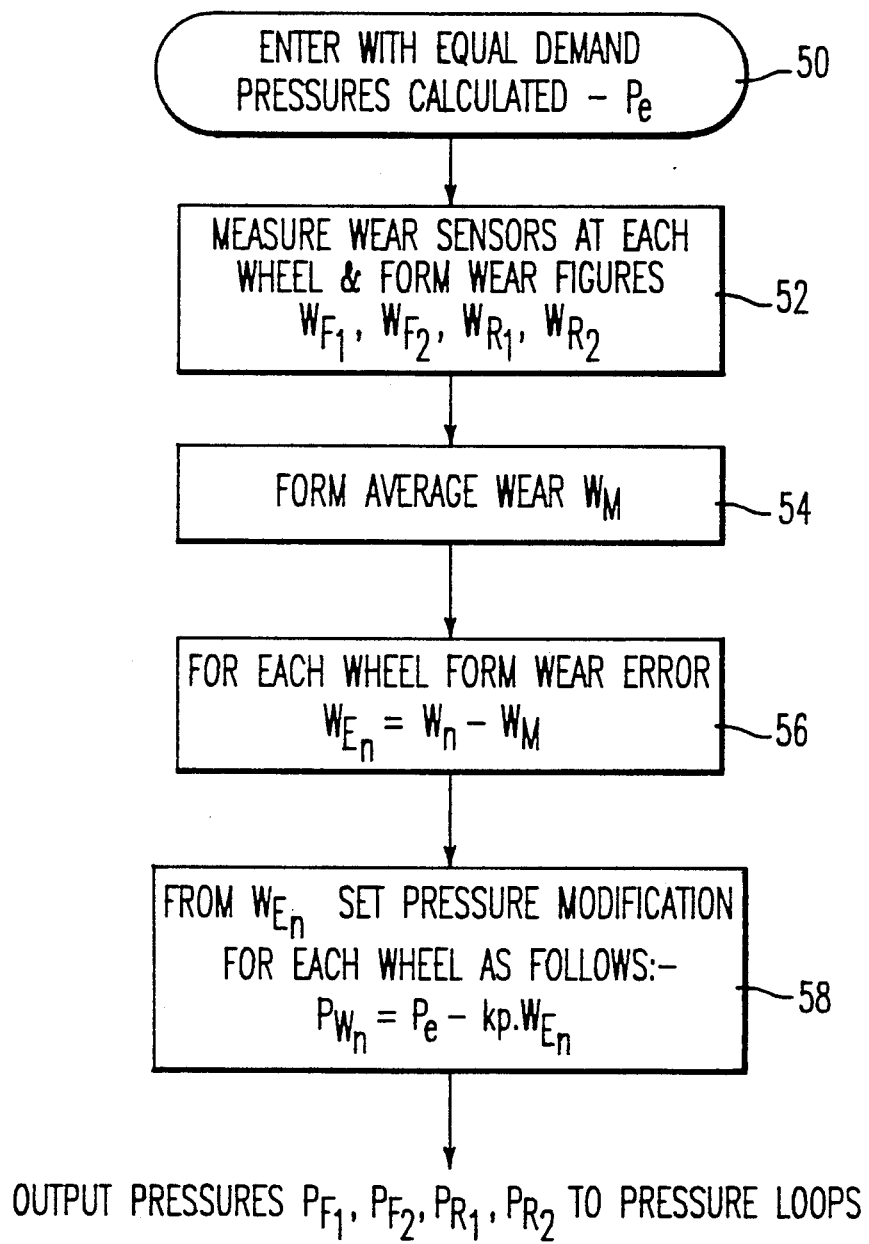
FIG. 4 is a flow diagram illustrating a sub-routine providing modification of the main routine in accordance with information from wear sensors in the brake linings.

An example of the software which can make this adjustment is shown in the flowchart of FIG. 4, which relates to a section of software which is entered once the Demand Pressures have been calculated as $P_F$ and $P_R$ where these are equal at demands below 0.2 g and is shown as the Wear Sensors Modifications routine in FIG. 2. This routine adjusts the braking pressure on each wheel specifically to generate a controlled pressure differential which is biassed towards the brake or brakes which have less wear.

Thus, as shown in FIG. 4, in a situation where equal demand pressure $P_e = P_F = P_R$ have been calculated at 50, the actual wear of the individual brake linings is measured at 52 to form wear FIGS. $W_{F1}$, $W_{F2}$, $W_{R1}$, $W_{R2}$. An average wear FIG. $W_m$ is established at 54 and a wear error signal compared to the average is then generated at 56 for each wheel in accordance with:

$$W_{En} = W_n - W_m$$

From the established Figures for $W_{En}$ for each brake, the pressure modification for each wheel is set at 58 from $$P_{Wn} = P_e - k_p \cdot W_{En}$$

where kp is a scaling factor.

Output pressures $PF_1$, $PF_2$, $PR_1$, $PR_2$ are supplied at 59 to the pressure loops.

Because this operation is only selected at low demands (e.g. below 0.2 g), and the differential is only small, there is no noticeable steering or rear end pull produced and should 0.2 g demand be exceeded, the pressure differential is reduced to zero. The differential is thus calculated by forming the wear Figures for each brake as an error when compared with the average wear $W_m$ and then using the individual error signals after modification by the scaling factor $k_p$ to calculate the small pressure offset from the original demand pressure in such a direction that low wear compared with average, produces a higher pressure demand to that control channel and high wear produces lower pressure demand.

The present system thus provides an EBS which at low braking demands produces equal brake wear whilst at higher demands provides full axle loading apportioning.

Although the aforegoing systems of the present invention are preferably achieved by software only, there is now described in connection with FIG. 5 one possible hard-wired embodiment for achieving the same operational performance.

Figure 5:
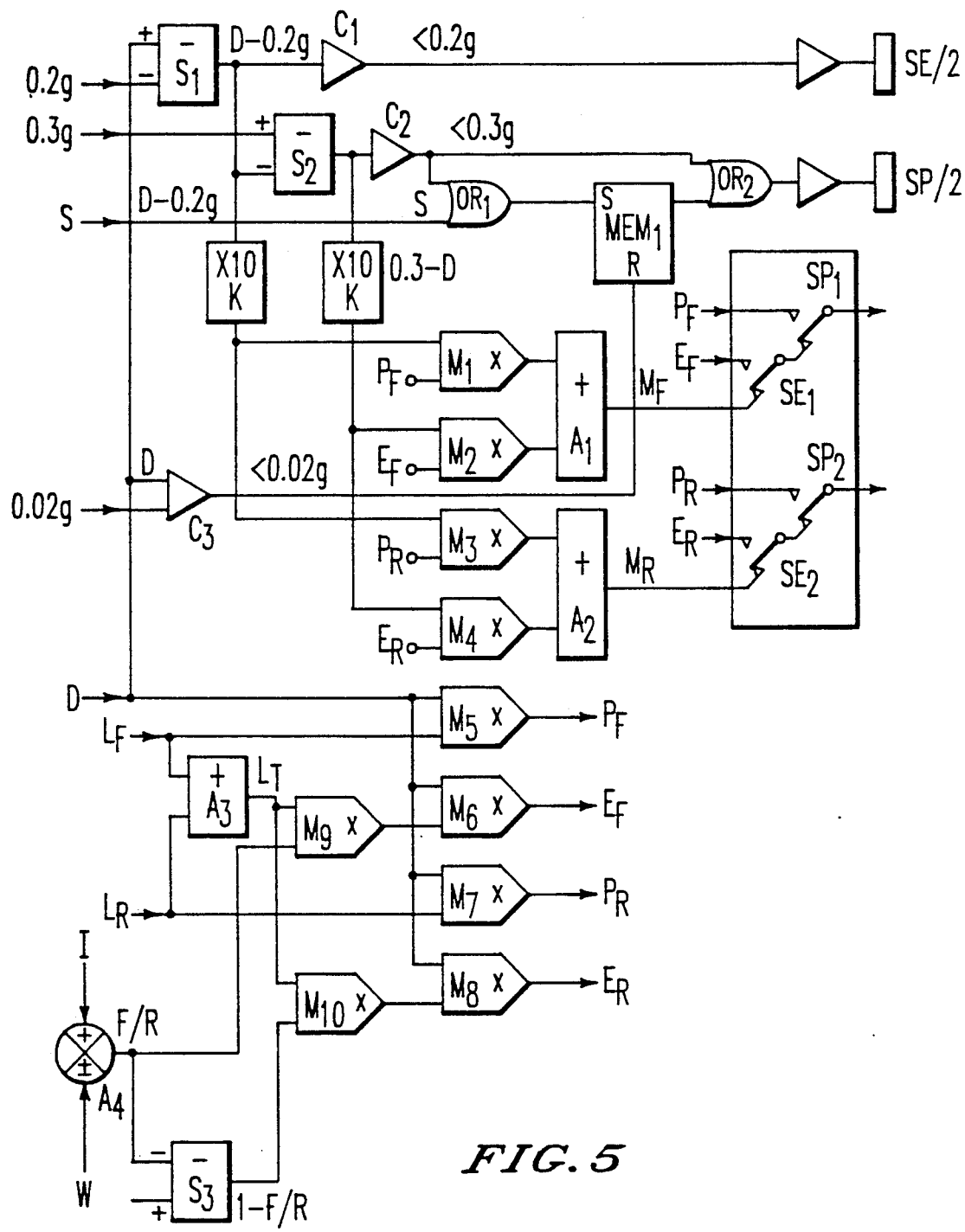
FIG. 5 is a block circuit diagram illustrating one means of performing the present invention.

The circuit of FIG. 5 processes the driver's braking demand signal D so as to generate, via subtractors $S_1$ and $S_2$ and comparators $C_1$ and $C_2$, control signals which represent demands in the range 0 to 0.2 g and in the range 0.3 g, respectively. These signals are used to control the pressure demand switching via double pole relays $S_E$ and $S_p$, such that $S_E$ is energised for demands below 0.2 g, to select equal wear demands $E_F$ and $E_R$, and $S_p$ is energised for demands above 0.3 g to select apportioned demands based on axle loads, designated $P_F$ and $P_R$.

In the demand range 0.2 g to 0.3 g, i.e. the transition range, demands progress gradually (based on actual demand) from equal wear settings $E_p$ and $E_R$ to apportioned settings $P_F$, $P_R$. These mixed settings are formed from the basic demand control values in multipliers $M_5$, $M_6$, $M_7$, $M_8$ and are mixed in the correct proportions in multipliers $M_1$, $M_2$ and adder $A_1$ for the front axle and in multipliers $M_3$, $M_4$ and adder $A_2$ for the rear axle.

Subtractor $S_1$ produces a signal D-0.2 g which, in the transition range, therefore represents value of 0 to 0.1 g, whilst subtractor $S_2$ produces a signal 0.3 g-D, respectively representing a value of 0.1 g to 0 as demand increases from 0.2 g to 0.3 g. Both these signals are scaled to provide multiplier inputs which range from 0–1 for multiplier $M_2$, $M_4$ inputs. Thus, at 0.2 g braking demand, control inputs on multipliers $M_1$, $M_3$ are zero whilst those on $M_2$, $M_4$ are 1 so that outputs $M_F$ and $M_R$ are equal to present levels $E_F$ and $E_R$. At a demand of 0.75 g, scaled outputs of subtractors $S_1$ and $S_2$ are both at 0.5 and $M_F$ has a value of 0.5 ($P_F + E_F$), whilst $M_R$ has a value of 0.5 ($P_R + E_R$). At a demand of 0.3 g, scaled outputs of subtractors $S_1$ and $S_2$ are 1 and zero respectively, so that $M_F = P_F$ and $M_R = P_R$. At other values, the mixed demands are made up from unequal proportions of $P_F$ and $E_F$, and $P_R$ and $E_R$, dependent upon the actual demand level D.

Should skidding occur at any demand level, a skid detection circuit (not shown—but well known per se in the art) produces a "skidding" signal S which sets up a flip-flop memory $MEM_1$, providing an overriding input to the switching stage of relay $S_p$ (shown as a relay, but could be a solid state switch). Relay contacts $SP_1$ and $SP_2$ have priority in selecting front and rear pressure demand signals to be $P_F$ and $P_R$ respectively. Gate $OR_1$ also provides for demands which have been greater than 0.3 g to be stored in memory $MEM_1$, so preventing a reversion to equal wear selections for distribution during falling demands. Signals $P_F$ and $P_R$ are graduated by multiplying suitable scaled front and rear axle load signals by scaled demand signals D to give load apportioned pressure demands to set axle braking. Equal wear signals are derived from a preset ideal braking ratio F/R based upon known brake capacities for torque output at equal braking. The basic braking ratio F/R is supplemented by calculation of the complement 1(F/R), i.e. R/F, and both are multiplied by the total vehicle load $L_T$, produced by adder $A_3$ (from signals $L_F$, $L_R$ corresponding respectively to front and rear axle loads, in front and rear multipliers $M_9$ and $M_{10}$, which then provide signals $E_F$ and $E_R$ when multiplied by braking demand in multipliers $M_6$ and $M_8$.

The preset ideal F/R ratio I, set theoretically to suit each vehicle type, is modified at adder $A_4$ by a composite brake wear signal W which is based upon the average rear lining thickness remaining, compared with the average front lining thickness. These signals are derived from special sensors developed for inclusion into the brake lining material itself, and processed in external wear averaging circuitry to generate a wear ratio signal arranged to adjust the F/R ratio so as to direct a braking bias within preset limits to the axle which has the thickest lining remaining.

Figure 6:
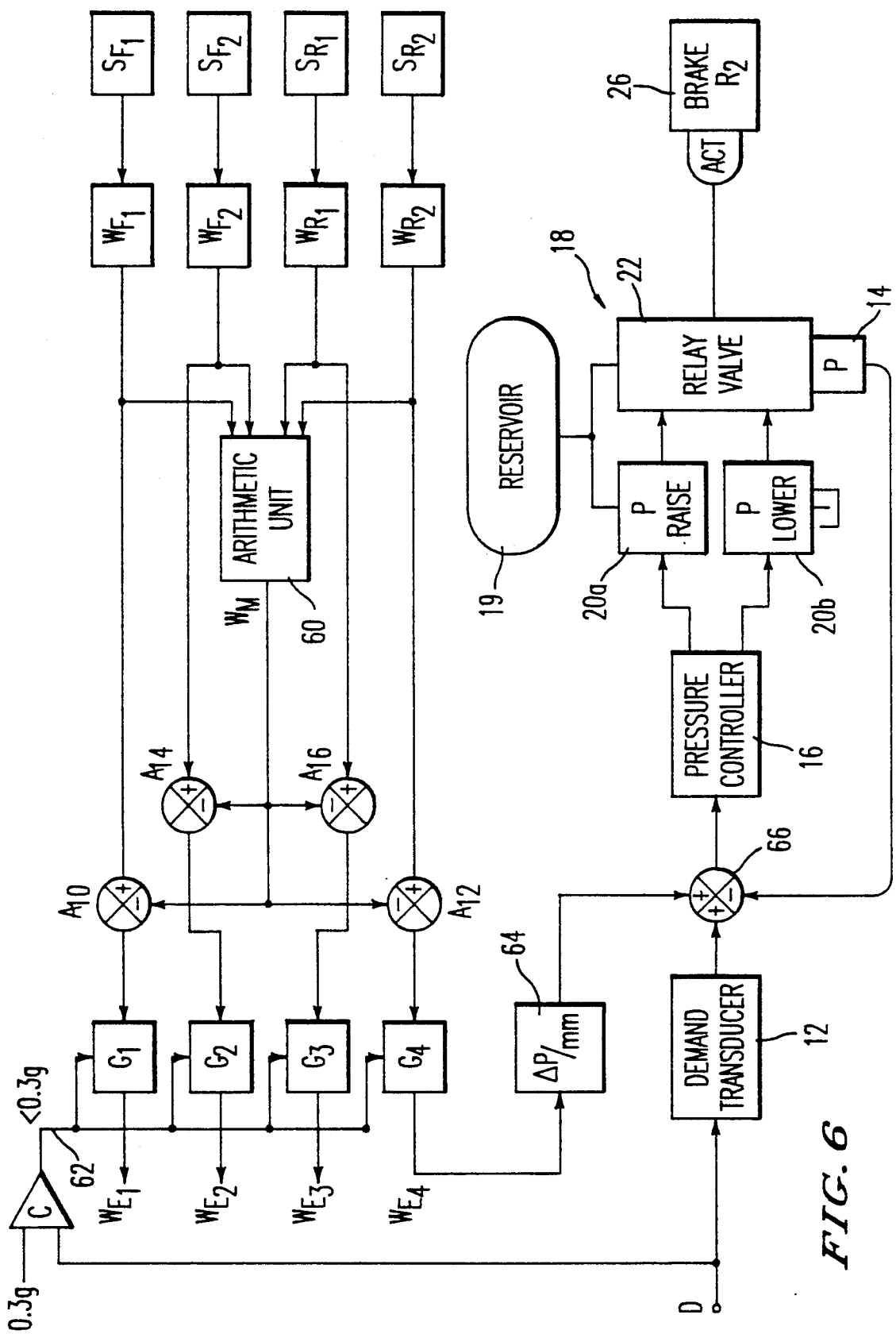
FIG. 6 is a block circuit diagram illustrating the use of wear sensors in the system.

There is shown in FIG. 6, an example of a circuit which includes wear sensors as described above. Individual wear sensors $SR_1$, $SF_2$, $SR_2$ are included within the linings of the front and back wheel brakes, respectively. The outputs of these sensors, modified by respective wear factors $WF^1$, $WF^2$, $WR^1$, $WR^2$, are averaged in an arithmetic unit 60 to provide $$\frac{WF_1 + WF_2 + WR_1 + WR_2}{4} = \text{average wear } W_M$$

The wear error at each wheel is calculated by subtractors $A^{10}$, $A^{12}$, $A^{14}$, $A^{16}$ which subtract the average wear $W^M$ from each scaled sensor output. The wear error signals are applied to gates $G^1$, $G^2$, $G^3$ and $G^4$ which only output these wear error signals when opened by control signals on a line 62 from a comparator C which is switched over when the driver's demand D (deceleration) is less than a preset value (in this case 0.3 g). In this condition the wear error signals $WE^1$, $WE^2$, $WE^3$, $WE^4$ are passed via respective pressure sealing elements 64 to adder 66 (see FIG. 1) in the relevant basic control loop. In FIG. 6, reference numeral 68 denotes a compensation system (known per se) which takes account of such factors as axle loading and operating gradient.

We claim:

1. A method for controlling brake actuation in an electronically controlled braking system comprising measuring brake demand level and splitting the operation of the brake actuation into three bands depending upon the measured brake demand level, wherein at low demand in a first band the braking pressures are set to generate equal brake lining wear at the vehicle axles, and at higher demands in a third band braking pressures are set to apportion braking between axles dependent upon the axle loads being carried, whilst in a second band, located intermediate the first and second bands, the braking is gradually changed from being equal to being fully apportioned, the extent of this change-over depending upon the actual level of demand within this second band, and including monitoring the actual wear equalization by sensors incorporated within the linings of said brakes, producing wear error signals for each brake compared with the average wear, and using such error signals to generate limited values of pressure differential between brakes such as to create small increases in braking at those brakes with the minimum wear and small reductions in braking at those brakes with above average wear.

2. An electronically controlled braking system, comprising means for splitting the operation of brake actuation into three bands depending upon the brake demand level, such that at low demand in a first band the braking pressures are set to generate equal brake lining wear at the vehicle axles, and at higher demands in a third band braking pressures are set to apportion braking between axles dependent upon the axle loads being carried, whilst in a second band, located intermediate the first and second bands, the braking is gradually changed from being equal to being fully apportioned, the extent of this change-over depending upon the actual level of demand within this second band, and further including sensor means incorporated within the linings of said brakes for monitoring wear equalization and a means for producing wear error signals for each brake compared with the average wear, such error signals being used to generate limited values of pressure differential between brakes such as to create small increases in braking at those brakes with minimum wear and small reductions in braking at those brakes with above average wear.

3. An electronically controlled braking system, comprising means for splitting the operation of brake actuation into three bands depending upon the brake demand level, such that at low demand in a first band the braking pressures are set to generate equal brake lining wear at the vehicle axles, and at higher demands in a third band braking pressures are set to apportion braking between axles dependent upon the axle loads being carried, whilst in a second band, located intermediate the first and second bands, the braking is gradually changed from being equal to being fully apportioned, the extent of this change-over depending upon the actual level of demand within this second band, said three bands being selected such that:

i) below 0.2 g demand, axle pressures are set for equal lining wear;
ii) above 0.3 g demand, axle pressures are set based on axle load measurements to give full load apportioning; and
iii) between 0.2 g and 0.3 g the change-over from equal lining wear to load apportioning is progressive and depends upon the actual demand level, and wherein if it is determined that demand deceleration lies in said first band, then equal pressures for each axle are arranged to be formed using demand and means axle load to establish:

$$P_e = \frac{KD(L_F + L_R)}{2}$$

where $P_e$ is the braking pressure established, D is the drivers demand signal, $L_F$ and $L_R$ are the measured loads on the front and rear axles, and K is a constant, and if it is determined that the drivers demand lies in said third band then a pressure signal for each axle is arranged to be formed using $$P_F = KDL_F \text{ and } P_R = KDL_R$$

where $P_F$ and $P_R$ are the front and rear axle pressures respectively and K is a further constant.

4. An electronically controlled braking system, comprising means for splitting the operation of brake actuation into three bands depending upon the brake demand level, such that at low demand in a first band the braking pressures are set to generate equal brake lining wear at the vehicle axles, and at higher demands in a third band braking pressures are set to apportion braking between axles dependent upon the axle loads being carried, whilst in a second band, located intermediate the first and second bands, the braking is gradually changed from being equal to being fully apportioned, the extent of this change-over depending upon the actual level of demand within this second band, and wherein, in order to maximize braking effect under adverse road conditions, there is included a means responsive to wheel skidding at any wheel which causes immediate reversion to a fully apportioned braking distribution, such distribution being retained until the brakes are released, and further including sensor means incorporated within the linings of said brakes for monitoring wear equalization and a means for producing wear error signals for each brake compared with the average wear, such error signals being used to generate limited values of pressure differential between brakes such as to create small increases in braking at those brakes with the minimum lining wear and small reductions in braking at those brakes with above average lining wear.

5. An electronically controlled braking system, comprising:

means for splitting the operation of brake actuation into different bands depending upon the brake demand level, such that at low demand in a first band the braking pressures are set to generate equal brake lining wear at the vehicle axles, and at higher demands in a second band braking pressures are set to apportion braking between axles dependent upon the axle loads being carried;

sensor means incorporated within the linings of said brakes for monitoring wear equalization; and means for producing wear error signals for each brake compared with the average wear, such error signals being used to generate limited values of pressure differential between brakes such as to create small increases in braking at those brakes with minimum lining wear and small reductions in braking at those brakes with above average lining wear.

* * * * *